United States Patent Office 3,152,272
Patented Oct. 6, 1964

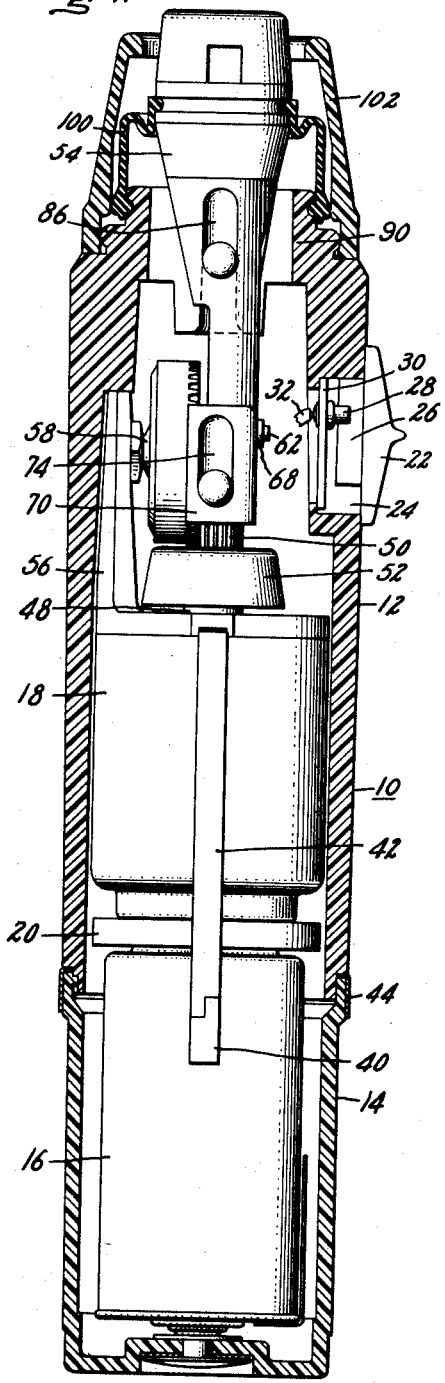
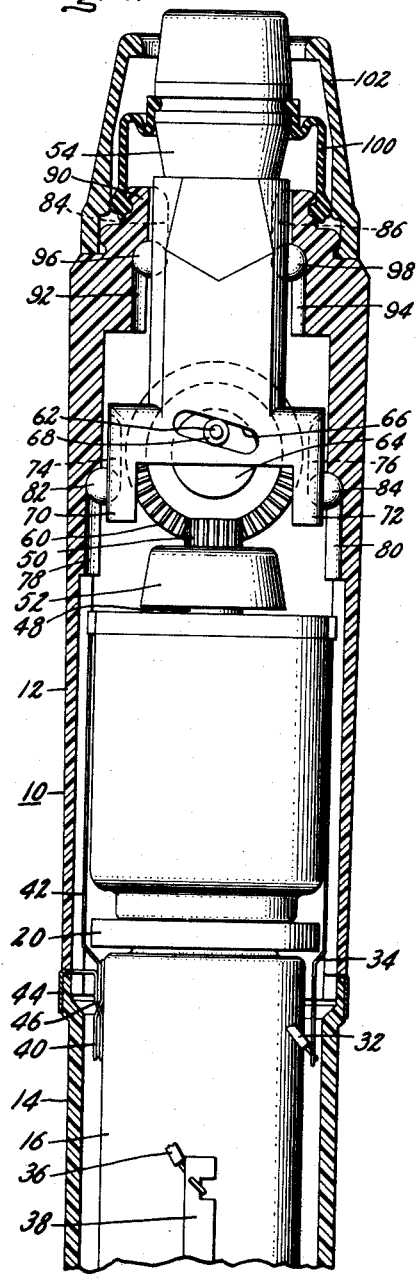

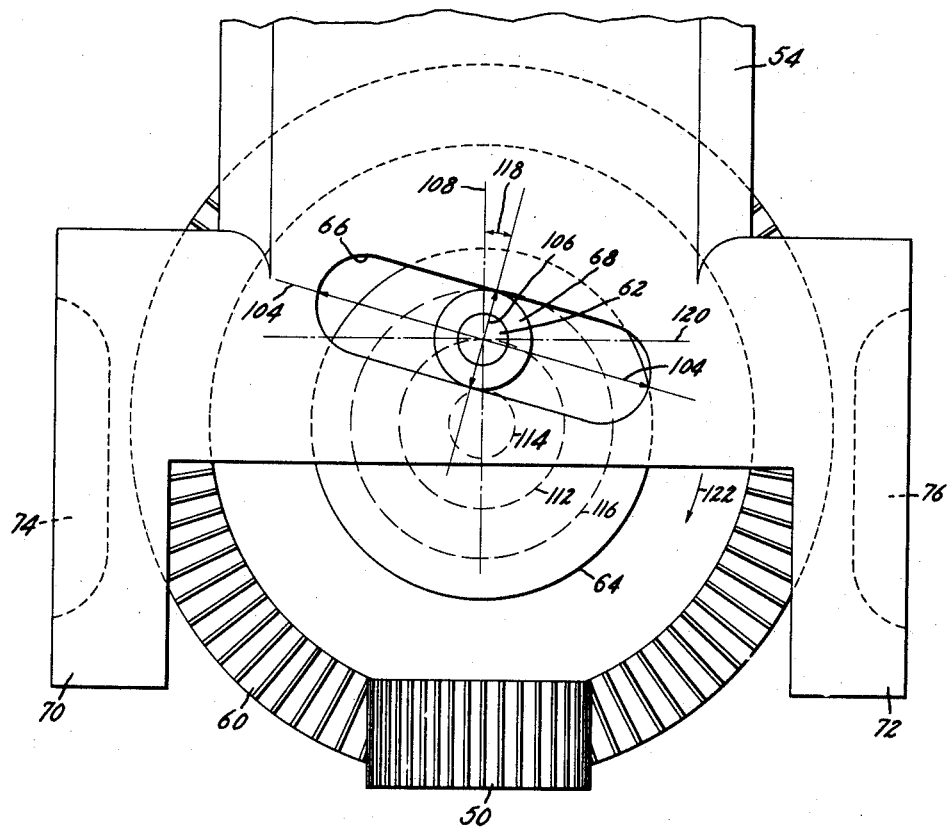

1

3,152,272
MOTION TRANSLATING MECHANISM FOR
TOOTHBRUSH POWER HANDLE
Garabed Hovhanesian, Westboro, and Daniels B. Fisk,
Framingham, Mass., assignors to General Electric Company, a corporation of New York
Filed May 31, 1962, Ser. No. 198,885
5 Claims. (Cl. 310—83)

This invention relates to a motorized handle for driving a toothbrush, and more specifically to an improved motion translating mechanism for use in such power handles.

In a copending application of Edgar A. Phaneuf and Hans Springer, Serial No. 198,883, filed May 31, 1962, and assigned to the same assignee as the present invention, there is disclosed an electrically operated toothbrush including a motorized handle for holding and driving a toothbrush. The handle contains an internal mechanism for converting the motor rotational output into straight line reciprocation of a holding member adapted to hold a toothbrush handle. More specifically, the rotational output is, through gearing, changed to circular motion of a driving pin which, in turn, cooperates with a slot in the holding member to reciprocate the member. It is, of course, desirable that such mechanism operate reliably and efficiently.

Accordingly, it is a primary object of the invention to provide a power handle with an improved motion translating mechanism which will cooperate with a toothbrush motor driving pin and other elements to reliably and efficiently convert arcuate movement of the pin into straight line reciprocation of a toothbrush holder.

Briefly stated, the improved motion translating and holding member of the invention is used in a motorized handle which includes a tubular casing and a motor positioned therein. A driving pin is mounted within the casing in a direction substantially perpendicular to the casing longitudinal axis. The motor is connected to move the pin in a circular path in a direction transverse to the pin axis. The motion translating member has one end adapted to receive a toothbrush handle, and its other end has a slot formed therein. This slot is formed so that the longer dimension of the slot is greater than the diameter of the path moved by the pin, and the shorter dimension of the slot is less than the path diameter but greater than the pin diameter. The pin extends through the slot. Thus, as the motor moves the pin through its circular path, the pin cooperates with the holding member to reciprocate the member. The handle also includes a guiding arrangement which permits only straight line reciprocation of the member in a direction parallel to the casing axis. The slot is formed so that a line perpendicular to the longitudinal axis of the slot is positioned at an acute angle with respect to the casing longitudinal axis. The tangent of this angle is approximately equal to the coefficient of friction between the pin and the walls of the slot. If the pin moves in a clockwise direction, the angle should extend in a clockwise direction from the casing axis. If the pin moves in a counterclockwise direction, the angle should extend counterclockwise.

Further features, objects and advantages will become apparent with reference to the following drawings, in which:

FIG. 1 is a cross-sectional view of a motorized toothbrush handle containing the toothbrush holding member of the invention;

FIG. 2 is a cross-sectional view of the toothbrush handle rotated 90° from the view of FIG. 1; and FIG. 3 is an enlarged, cutaway view of a portion of the toothbrush holding member of the invention and the driving mechanism of the handle.

In the cross-sectional views of FIGS. 1 and 2, there is shown a motorized handle suitable for driving a toothbrush. The handle includes a tubular casing 10 having a generally cylindrical shape and formed of an upper portion 12 and a lower portion 14. The casing is preferably made of plastic or similar electrically insulating material which is relatively strong and lightweight.

In the casing lower portion 14, there is positioned a battery 16 for driving a small direct current motor 18 positioned in upper casing portion 12 and spaced from the battery by an insulating disk 20. The motor is controlled by a suitable on-off switch mechanism which includes, for example, an external control button 22 which is slidably mounted within a recess 24 in upper casing portion 12. The button 22 is attached to a contact member 26 that is slidably moved into or out of engagement with a pair of fixed terminals, one of which is shown at 28 extending through a plate 30 positioned in recess 24. Terminal 28 is connected by wire 32 to one terminal 34 of motor 18 as shown in FIG. 2. The other switch terminal is connected by wire 36 to a terminal 38 of battery 16, also seen in FIG. 2. Connecting the other battery terminal 40 to the other motor terminal 42 completes the motor battery operating circuit.

In operation, the motor 18 produces a rotational output through its shaft 48 carrying a pinion 50 and ballast wheel 52. A member or plunger 54 for holding a toothbrush is shown positioned in the upper end of casing portion 12. To obtain the straight line reciprocatory motion of the holding member 54, it is necessary that the handle be provided with motion translating means to translate the motor rotational output into reciprocal movement in the proper direction and to transmit this movement to the member 54 and eventually a toothbrush. For this purpose, the motor 18 is provided with a mounting bracket 56 attached to one end of the motor, extending axially within the casing 10 adjacent the casing inner cylindrical surface. The bracket 56 supports a stub shaft 58 carrying a gear 60 adapted to be driven by the pinion 50. A shaft or pin 62 is secured to disk 64 and eccentrically mounted on gear 60. The pin 62 extends in a direction parallel to the stub shaft 58 and perpendicular to the longitudinal axis of the casing 10. Thus, the rotational output of pinion 50 is translated into circular movement of pin 62 in a direction transverse to the pin axis.

To translate the circular motion of pin 62 into axial movement of holder 54, there is provided a uniquely formed slot 66 in the lower end of toothbrush holder 54. The slot which extends in a direction primarily transverse to the longitudinal axis of the casing, as seen in FIG. 2, is adapted to receive a roller 68 mounted on pin 62 to serve as a bearing for the pin. As the motor pinion 50 rotates, the resulting circular movement of pin 62 is translated into reciprocal movement of the plunger 54 by means of slot 66. Further details concerning the motion translating mechanism will be given in later paragraphs.

It may be seen from FIGS. 1 and 2 that the holding member 54 is an elongated somewhat cylindrical member having its lower end formed in the shape of a yoke comprising a pair of diametrical arms 70 and 72 which straddle pin 62 and pinion 50. The upper end of the holding member is adapted to receive the shank portion of a toothbrush so that the brush will move with the holding member. To reduce friction between the member 54 and the surrounding casing portion 12, a ball bearing support arrangement is provided. Each of the arms 70 and 72 is formed with an axially extending groove 74 and 76, respectively, in the surface facing the inner wall of casing 12. A pair of complementary grooves 78 and 80 formed in the interior of casing 12 mate respectively with grooves 74 and 76. A ball bearing 82 is positioned within the passage formed by grooves 72 and 76, and ball 84 is similarly positioned in the grooves 76 and 80.

To complement the guiding action and stability provided by the bearings and grooves in the lower end of holder 54, there is provided an additional pair of grooves 86 and 88 diametrically positioned intermediate the ends of the holder. As can be seen from FIG. 2, this portion of holder 54 has a diameter smaller than the yoke portion so that the holder will fit within the neck 90 of upper casing portion 12. A pair of grooves 92 and 94 formed within the neck portion 90 mate respectively with holder grooves 86 and 88, and ball bearings 96 and 98 are respectively positioned within the passages formed by the mating grooves. Thus, it should be appreciated that with the two sets of grooves and ball bearings, the holder 54 is smoothly guided for reciprocal straight line movement within the casing 10 as it is moved by the eccentrically mounted pin 62.

To prevent moisture and solid particles from entering the toothbrush handle, there is provided a flexible grommet 100 made of rubber or similar material extending between the upper end of holder 54 and the upper end of casing portion 12. To protect the fingers of the operator and to prevent interference with the grommet 100, there is provided an annular cap 102 which fits over the grommet and surrounds the socket end of holder 54. The cap is made of plastic or similar material formed to snap over the casing neck 90 and be easily removed for cleaning purposes.

In order to obtain a satisfactory and successful motorized toothbrush handle, it is of course essential that the handle provide reliable operation. Also it is extremely important that the handle be lightweight for easy manipulation. To minimize the weight of the handle, it is desirable to minimize the size and weight of the motor and battery, and this accordingly limits the power output. In order to make maximum use of the motor output it is necessary that the motion translating mechanism which converts the motor rotational output into reciprocation of the holding member be as efficient as possible. In accordance with the present invention, maximum efficiency and reliability of the eccentric pin and slot arrangement described herein is obtained by uniquely positioning the slot 66 giving due consideration to the directions of movement of the various parts and the frictional forces involved.

Referring to the enlarged view of FIG. 3, it may be seen that the slot 66 has an elongated cross-section which may be described as an elongated oval or elliptical cross-section. For purposes of description, the longer dimension 104 may be considered the major axis, and the shorter dimension 106 of the cross-section may be termed the minor axis. The line 108 may be considered to represent the longitudinal axis of the casing and the holding member as well as the direction of movement of the holding member. Further, the line 108 intersects the center line of gear 60 and is roughly coincident with the center of pinion 50 and motor shaft 48. It can be seen that the pin 62 extends through the slot 66 with the pin center line being substantially perpendicular to the slot cross-section.

The circular path of the pin center line during operation of the motor is shown by the line 112; similarly, the paths of the inner and outer surfaces of the roller 68 are shown by the dotted lines 114 and 116, respectively. The slot major axis 104 is greater than the diameter of circle 116, and the minor axis 106 is less than the path diameter 116.

In accordance with the invention, the slot 66 within the holder 54 is positioned such that the minor axis 106 of the slot forms an acute angle 118 with respect to the line 108 representing the direction of travel of holder 54 and representing casing longitudinal axis 108. The angle 118 is shown to be approximately 15° in FIG. 3. However, it has been found that the most desirable angle is somewhat dependent upon the materials employed for the roller 68 and the holding member 54. More specifically, the co-efficient of friction between these two members has been discovered to bear a definite relation to the optimum angle which should be formed between the minor axis of the cross-section and the line 108. It has been found that the optimum angle is roughly that angle whose tangent is approximately equal to the coefficient of friction between the roller and the holding member. In the case of a bearing bronze roller and a plastic holding member, the coefficient of friction is approximately equal to the tangent of a 15° angle.

The explanation for the improved results obtained by positioning the slot as described, concerns the force output of the moving pin 62. As the pin 62 moves through its circular path, the force exerted by the pin is represented by a continuously moving line which is tangent to the circular path described by the pin as it rotates. These forces may of course be analyzed by considering their components in reference direction such as their horizontal and vertical components. By considering the line 108 as representative of the vertical direction and line 120 as representative of the horizontal direction, it will be appreciated that it is the vertical component of the forces which tends to move the holding member 54. Thus, when the pin 62 is positioned as shown in FIG. 3 wherein its axis intersects the line 108, the vertical component of the force is zero with all force being directed in the horizontal direction as indicated by the line 120. As the pin is moved through a 90° arc the vertical component of the pin force output increases from zero to maximum, and then decreases to zero during the next 90° arc. Thus, it can be seen that the line 112 intersects the line 108 twice during each revolution at which point the vertical force or the force tending to move the plunger is at zero. For sake of convenience, these two positions may be referred to as the center line, or dead center positions. Since it is the vertical resistance to movement of the plunger or holding member 54 which provides the load for the moving pin 62 and the vertical force component at dead center is zero, the pin tends to take one of the center line or dead center positions when the motor is stopped. When the motor is once more started, it is desirable that the vertical load be at a minimum to permit the pin to move from the dead center position sufficiently far so that the vertical component of the force exerted by the pin is sufficiently large to overcome the inertia of the member 54. Thus, should the roller stop at its uppermost point of travel all of the force resulting from the torque supplied by the motor upon restarting would be in the horizontal plane or parallel to axis 120, and the inclined slot 66 would permit a vertical force component to overcome the starting load point to cause member 54 to move in a vertically downward direction toward pinion 50.

It has been found that if the minor axis of the slot cross-section is formed coincident with the direction of travel represented by line 108 substantial force would be required to move the pin from the dead center position if it had stopped in such position. During each revolution of the pin, there will be two areas which might be termed minimum resistance or minimum load zones regardless of the angular position of the slot. These zones exist where the pin major axis 104 is roughly parallel to the direction of movement of the pin. Technically speaking, this occurs at only two points; however, as a practical matter, the areas on each side of these points for a short angular distance may be considered as minimum load zones. By positioning the slot so that the pin 62 is just entering the zone of minimum resistance to movement when it is at the dead center position, reliable starting operations may be obtained. It will be appreciated that the minimum resistance or load zone may be considered to vary depending upon the coefficient of friction of the sliding components.

From the foregoing description, it will be appreciated that the angle 118 formed by the minor axis 106 and the direction of travel indicated by the line 108 bears a definite relation to the direction of movement of pin 62. When the pin is moved in a clockwise direction, as indicated by arrow 122, in FIG. 3, the slot 66 should be positioned so that the angle is positioned in a clockwise direction with respect to the line 108. If the pin were to be moved in a counterclockwise direction, the angle 118 should extend in a counterclockwise direction from the line 108. Stated in other words, the line 108 marks the beginning of the minimum load zone, and the angle 118 should angularly extend in the circular direction of movement of the pin. Further, it might be said that the outer surface of the pin enters the angled area by intersecting the side of the angle defined by the casing axis.

From the foregoing description, it will be appreciated that a smoothly operating motion translating mechanism for a motorized toothbrush handle has been described and that the arrangement is particularly advantageous for insuring reliable starting operation. While a specific embodiment of the invention has been shown and described, it should be understood that the invention is not limited to the particular construction disclosed. Accordingly, it is intended in the appended claims to cover all modifications within the true spirit and scope of the invention.

Having thus described the invention, what is claimed is:

1. In a motorized handle for driving a toothbrush, a casing having a longitudinal axis, a holding member positioned within one end of said casing, said member having one end adapted to receive a toothbrush, a motor positioned in said casing, rotary means driven by said motor, a pin extending in a direction substantially perpendicular to said casing longitudinal axis, said pin being mounted on said rotary means to be moved in a circular path by said motor in a direction transverse to the pin axis, an elongated slot extending through the opposite end of said holding member having a major and a minor axis, the major axis of the slot being greater than the diameter of the path moved by said pin, the minor axis of the slot being less than the path diameter but greater than the pin diameter, said pin and slot being arranged so that the pin extends through the slot in a direction perpendicular to the longitudinal axis of the slot whereby circular movement of said pin reciprocates said holding member, guide means permitting only straight line reciprocation of said member in a direction parallel to the casing longitudinal axis, the minor axis of the slot being located with respect to said holder direction of travel at an acute angle whose tangent is approximately equal to the coefficient of friction between said pin and said slot, the rotational direction of said pin being the same as the angular direction said angle extends from the holder direction of travel.

2. In a motorized handle for driving a toothbrush, a tubular casing having a longitudinal axis, a toothbrush holder member positioned in one end of said casing, said member having one end adapted to receive a toothbrush handle, a motor positioned in said casing, rotary means driven by said motor, a driving pin eccentrically mounted on said rotary means to be moved in a circular path in a direction transverse to the pin axis, a slot extending through the opposite end of said holding member having substantially an elongated oval or elliptical shape with a major and a minor axis, the major axis of the slot being greater than the diameter of the path moved by said pin, the minor axis of the slot being less than the path diameter but greater than the pin diameter, said pin extending in a direction substantially perpendicular to said casing longitudinal axis and extending through the slot, guide means permitting only straight line reciprocation of said member in a direction parallel to the casing longitudinal axis, the minor axis of the slot being located with respect to said casing longitudinal axis at an acute angle in the range between 10° and 20°.

3. A motorized toothbrush handle comprising a casing having a longitudinal axis, a toothbrush holding member positioned within one end of said casing, said member having one end adapted to receive a toothbrush, a battery positioned in the opposite end of said handle, a motor positioned adjacent said battery and driven by the battery, rotary means driven by said motor, a cylindrical pin extending in a direction substantially perpendicular to said casing longitudinal axis, said pin being eccentrically mounted on said rotary means to be moved in a circular path by said motor in a direction transverse to the pin axis, a slot extending through the opposite end of said holding member having a major and a minor axis, said pin and slot being arranged so that the pin extends through the slot, the major and minor dimensions of said slot being of such size with respect to the circular path of said pin that the pin circular movement reciprocates said holding member, guide means permitting only straight line reciprocation of said member in a direction parallel to the casing longitudinal axis, said pin being moved through two zones of minimum load in the two portions of its circular path wherein the slot major axis is roughly parallel to the direction of movement said pin, said slot minor axis forming an acute angle with respect to said casing axis such that said pin will reach points of minimum load in said zones of minimum load after crossing said casing axis.

4. A motorized toothbrush handle comprising a tubular casing having a longitudinal axis, a member slidably mounted for reciprocation within said casing, a motor positioned in said casing, rotary means driven by said motor, a driving shaft eccentrically mounted on said rotary means to be moved in a circular path in a direction transverse to the shaft axis, a slot extending through one end of said member and having an elongated oval cross-section with a major and a minor axis, the major axis being greater than the diameter of the path of said shaft, the minor axis being less than the path diameter but greater than the shaft diameter, said shaft and slot being arranged such that the shaft extends through the slot so that circular movement of said shaft reciprocates said member, the minor axis of the slot being positioned with respect to said casing axis at an acute angle whose tangent is approximately equal to the coefficient of friction between said shaft and said slot, said angle being located clockwise from the casing axis if said shaft is to be moved in a clockwise direction and located counterclockwise from the axis when the shaft is to be moved in a counterclockwise direction.

5. In a motorized toothbrush handle, a casing having a longitudinal axis, a plastic toothbrush holding member positioned within one end of said casing, said member having one end adapted to receive a toothbrush handle, a motor, positioned in said casing, rotary means driven by said motor, a cylindrical pin extending in a direction substantially perpendicular to said casing longitudinal axis, said pin being mounted on said rotary means to be moved in a circular path by said motor in a direction transverse to the pin axis, a steel roller bearing mounted on said pin, a slot extending through the opposite end of said holding member having substantially an elongated oval cross-section with a major and a minor axis, the major axis being greater than the diameter of the path moved by said pin and roller bearing, the minor axis being less than the path diameter but greater than the roller bearing diameter, said pin and slot being arranged so that the pin extends through the slot in a direction perpendicular to the slot cross-section so that the circular movement of said pin reciprocates said holding member, guide means permitting only straight line reciprocation of said member in a direction parallel to the casing longitudinal axis, the minor axis being positioned with respect to said casing longitudinal axis at an acute angle whose tangent is approximately equal to the coefficient of friction between said roller and the walls defining said slot, said angle being positioned in the same angular direction from said casing axis as the rotational direction of said pin.

References Cited in the file of this patent

UNITED STATES PATENTS

| | | |
|---|---|---|
| 2,078,845 | Goldschmidt | Apr. 27, 1937 |
| 2,644,972 | Ubel | July 14, 1953 |
| 3,064,583 | Burt | Nov. 20, 1962 |